United States Patent [19]

Weissman et al.

[11] Patent Number: 5,409,600
[45] Date of Patent: Apr. 25, 1995

[54] HYDRODESULFURIZATION AND HYDRODENITROGENATION OVER A TRANSITION METAL OXIDE AEROGEL CATALYST

[75] Inventors: Jeffrey G. Weissman, Wappinger Falls, N.Y.; Edmond I. Ko, Pittsburgh, Pa.

[73] Assignee: Texaco Inc., White Plains, N.Y.

[21] Appl. No.: 867,544

[22] Filed: Apr. 13, 1992

[51] Int. Cl.⁶ .................... C10G 45/04; C10G 45/06; C10G 45/08
[52] U.S. Cl. .............................. 208/216 R; 208/217; 208/254 H
[58] Field of Search .............................. 502/349, 350; 208/216 R, 217, 254 H

[56] References Cited

U.S. PATENT DOCUMENTS

| | | | |
|---|---|---|---|
| 3,137,658 | 6/1964 | Drake et al. | 502/236 |
| 3,159,588 | 12/1964 | Hansford | 502/236 |
| 3,264,227 | 8/1966 | Cramer et al. | 502/11 |
| 4,018,672 | 4/1977 | Moser | 208/216 R |
| 4,128,505 | 12/1978 | Mikovsky et al. | 502/220 |
| 4,186,080 | 1/1980 | Miyovsky et al. | 208/143 |
| 4,196,101 | 4/1980 | Wilson et al. | 502/221 |
| 4,388,222 | 6/1983 | Wilson et al. | 502/211 |
| 4,550,093 | 10/1985 | Fanelli et al. | 502/107 |
| 4,619,908 | 10/1986 | Cheng et al. | 502/214 |
| 4,622,310 | 11/1986 | Iacobucci | 502/208 |
| 4,667,417 | 5/1987 | Graser et al. | 34/9 |

OTHER PUBLICATIONS

Parker et al., "Evaluation of Titania–Alumina–Supported Hydrogenation Catalysts for Coal Liquefaction Applications," *Energy and Fuels*, 1989, 3, pp. 350–356, (1989).

Sedacek, et al, "Hydrodesulphurization of Thiophene over Zirconia and Alumina Supported Co–Mo Catalysts", *Collect. Czech. Chem. Common.*, vol. 54, pp. 2064–2068 (1989).

Ramirez et al, "Hydrodesulphurization Acitiviy and Characterization of Solphided Mo and Co–Mo Catalysts—Comparison of Alumina, Silica Alumina, and Titania–Supported Catalists", *App. Catalysis*, 52, pp. 211–224 (1989).

Daly, "The Use of Binary Oxides as Catalyst Supports for Hydrodesulfurization and Hydrodenitrogenation", *Journal of Catalysis*, 116, pp. 600–603 (1989).

Okamoto et al., "Active Sites of Nolybdenum Sulfide Catalysts Supported on $Al_2O_3$ and $TiO_2$ for Hydrodesulfurization and Hydrogenation", *Journal of Catalysis*, 120, pp. 29–45, (1989).

Muralidhar et al., "Catalytic Functionalities of Supported Sulfides I Effect of Support and Additives on the CoMo Catalyst", *Journal of Catalysis*, 85, pp. 44–52 (1984).

Massoth et al., "Catalytic Functionalities of Supported Sulfides II Effect of Support on Mo Dispersions", *Journal of Catalysis*, 85, pp. 53–62 (1984).

Pratt et al., "Morphology and Activity of $MoS_2$ on Various Supports: Genesis of the Active Phase", *Journal of Catalysis*, 124, pp. 416–432 (1990).

Matheson et al., "Activity of Ni—Mo Hydrodesulfurization Catalysts Supported on Mixed Alumina-Zirconia", *React. Kinet. Catal. Lett.*, vol. 18, No. 1-2, pp. 21–24 (1981).

Daly et al, "Hydrodesulfurization over a $TiO_2$—$ZrO_2$— Supported CoO—$MoO_3$ Catalyst", *Journal of Catalysis*, 108, pp. 401–408, (1987).

Wang et al., "Catalytic Hydrodesulforization and Hydrodenitrogenation over Co—Mo on $TiO_2$—$ZrO_2$—$V_2O_5$, " *Journal of Catalysis*, 117, pp. 266–274 (1989).

*Primary Examiner*—Asok Pal
*Assistant Examiner*—Walter D. Griffin
*Attorney, Agent, or Firm*—Christopher Nicastri

[57] ABSTRACT

A method for preparing catalysts suitable for hydroprocessing and hydrocracking of naphthas and gas oils is provided. Catalysts consist of an aerogel support comprising one or more transition metal oxide polymers, prepared by the super-critical fluid extraction of alkoxide alcogels, together with one or several promoting metals in oxide or sulfide form. A process for hydroprocessing hydrocarbons using the catalyst of this invention is also provided.

24 Claims, 2 Drawing Sheets

HYDRODESULFURIZATION AND HYDRODENITROGENATION OVER A TRANSITION METAL OXIDE AEROGEL CATALYST

BACKGROUND OF THE INVENTION

This invention relates to a catalyst composition useful in the removal of sulfur and nitrogen from gas oils, as practiced in the hydrocarbon refining industry, in a process commonly referred to as hydroprocessing.

A solid catalyst, such as the material provided by the present invention, is contained by a reactor. The material to be hydroprocessed is passed over the catalyst together with a flow of hydrogen, at comparatively moderate temperatures and pressures and flow rates. In customary practice, the catalysts consist of metal oxides on a support, where the oxides are converted to sulfides prior to use to produce an active, stable catalyst. The hydroprocessed product is a gas oil in which the sulfur and nitrogen contents have been substantially reduced. Any improvement of this process, especially as relating to the use of a material having improved activity for catalyzing this reaction, will result in significant economic savings as well as improved yield.

In the catalytic hydroprocessing art, as it is currently practiced, catalysts typically consist of active metals, either molybdenum or tungsten plus either nickel or cobalt, optionally with promoters, on an inert support consisting of alumina, silica or a mixture thereof. The use of different supports, or other active metals, has been found to either enhance or decrease the activity as compared to the base catalyst. Also, varying the method of preparation of these materials can result in a change in catalytic activity.

Hydroprocessing catalysts have traditionally been prepared by depositing aqueous solutions of molybdenum, tungsten, nickel and cobalt salts onto a support, either in separate steps or by co-deposition. Alternately, the support and the deposited metals can be formed simultaneously. Intermediate and final calcining steps are necessary to produce the final form of the catalyst, i.e., an alumina support holding more-or-less dispersed molybdenum, tungsten, nickel and cobalt oxides. Numerous variations in both methods and compositions of this procedure have been described.

These hydroprocessing catalysts can be improved. One method is to use an improved support structure, including improvements in composition and physical structure. A small increase in the cost of the catalyst, which might be incurred by implementing additional process steps in making the improved support structure, can result in significant overall savings, by permitting operation of the hydroprocessing process at less severe conditions or at a higher throughput.

Therefore, it is an object of the present invention to provide an improved catalyst, suitable for use in hydroprocessing, containing molybdenum and nickel on an improved titanium and/or zirconium oxide support.

Moreover, another object of the present invention is to provide a process for the removal of sulfur and nitrogen from hydrocarbon streams, employing the improved hydroprocessing catalyst of this invention.

SUMMARY OF THE INVENTION

This invention provides a method of preparing a catalyst composition suitable for hydroprocessing hydrocarbons comprising:
  forming a transition metal oxide aerogel support;
  drying and heat treating the aerogel support;
  depositing at least one active metal on the aerogel support; and
  drying and heat treating the deposited aerogel support.

This invention also provides a process for the catalytic removal of sulfur and nitrogen from refinery hydrocarbon streams comprising:
  combining the hydrocarbon streams with a gas containing at least 80% $H_2$; and
  passing the gas-stream combination over a catalyst composition prepared by the method described above.

The aerogel support is prepared using a sol-gel route, in which an alcohol or organic solvent soluble transition metal alkoxide is hydrolyzed with water and an optional homogeneously dispersed mineral acid, to form an alcogel, consisting of the transition metal or metals polymerized as an oxide network, containing alcohol or organic solvents and water in pores. The alcogel is converted to an aerogel by removal of the alcoholic and organic solvents and water through extraction. Extraction is performed by replacing the alcohol, water and solvents with a supercritical fluid, such as carbon dioxide, in order to retain the favorable structure and properties of the aerogel, and then changing the extraction conditions to convert the super-critical fluid to a gas, resulting in a highly-porous dry powder oxidic support.

This aerogel is mixed with oxides and/or sulfides of metals to form a catalyst for use in a process for the removal of sulfur and nitrogen from hydrocarbon streams.

As will be shown, a material prepared according to this invention and employed as a catalyst for hydroprocessing, gives improvements over catalysts currently used in the hydroprocessing art. On a surface area basis, both sulfur and nitrogen removal activities of this catalyst are significantly better than that which has been reported for similar materials which are not prepared by super critical fluid extraction of alcogels to form catalyst supports. In addition, this material is shown to be different from similar materials, in that X-ray diffraction shows the material to have several unique properties.

BRIEF DESCRIPTION OF THE DRAWINGS

FIG. 1 is an X-ray diffraction pattern of a catalyst comprising Ni and Mo deposited on a support comprising $TiO_2/Al_2O_3$ (80%/20%) prepared by the process of the present invention. Plot A is the fresh catalyst and plot B is the used catalyst.

DETAILED DESCRIPTION OF THE INVENTION

Figure 2:
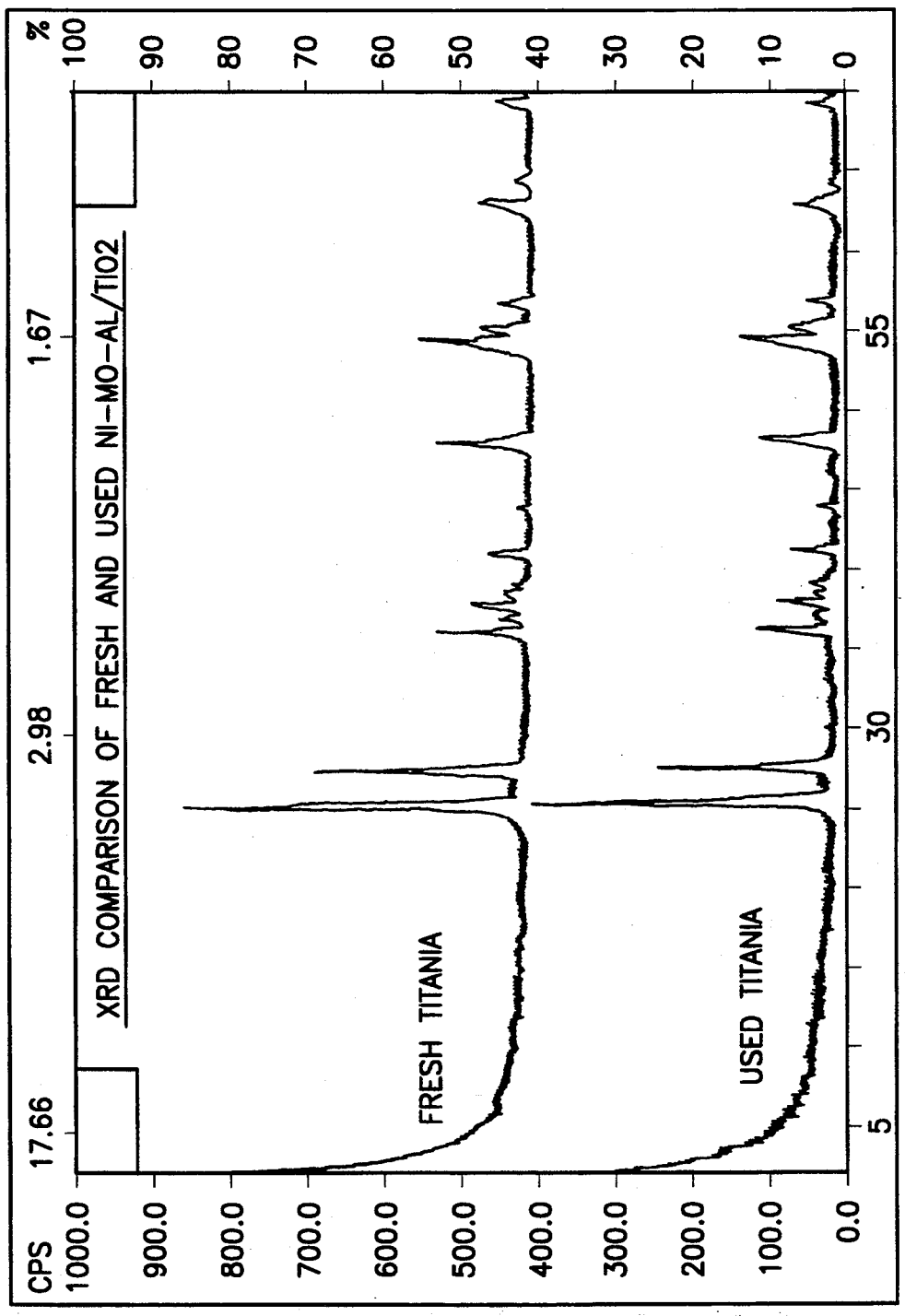
FIG. 2 is an X-ray diffraction pattern of a catalyst comprising Ni and Mo deposited on a support comprising $TiO_2/Al_2O_3$ (80%/20%) prepared by a conventional method. Plot A is the fresh catalyst and plot B is the used catalyst.
Figure 2:
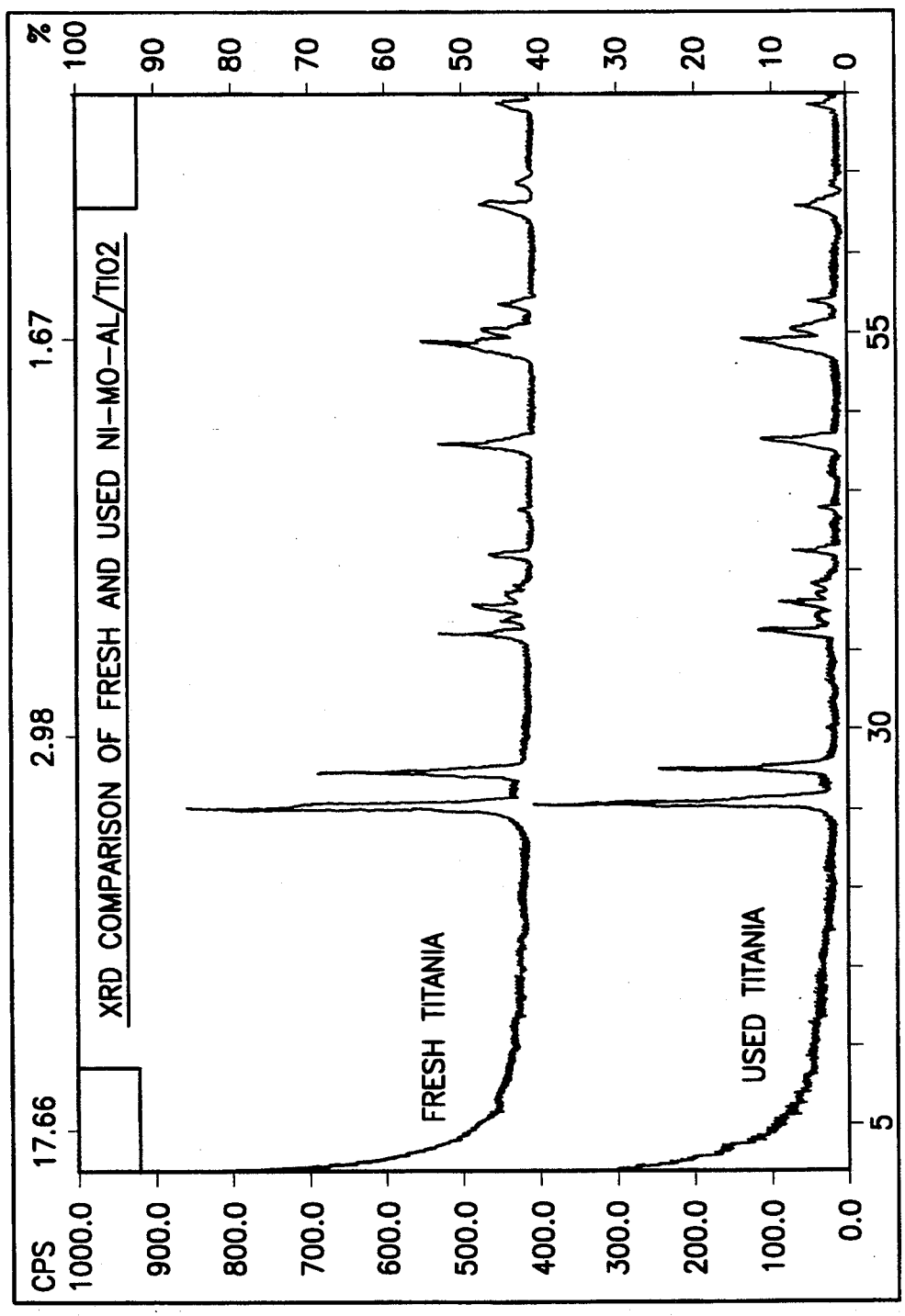

This invention involves the preparation of a support material, the addition of active metals to the support material to form a catalyst, and the use of the catalyst in a process for the removal of impurities from petroleum fractions.

The Aerogel Support

Transition metal oxide supports useful in the practice of this invention include the oxides of transition metals from groups 3, 4, 5, 6, and 7 of the periodic table, Preferred oxides are $TiO_2$, $ZrO_2$, $V_2O_5$, $Nb_2O_5$, $Ta_2O_5$, $MoO_3$, and $WO_3$. More preferred are $TiO_2$ and $ZrO_2$.

Mixtures of two or more transition metal oxides are also useful, such as a mixture of $TiO_2$ and $ZrO_2$ in any relative proportion, i.e., between 0 and 100 wt. % of one component plus between 100 and 0 wt. % of each other component. It is also useful to mix the single or multiple transition metal oxide supports with an organic or inorganic binder, to facilitate handling of the material. Such a binder can be an organic acid such as oxalic or propionic acid, added in powdered or solution form, or an inorganic oxide or water-containing inorganic oxide or hydroxide, such as the various aluminas, clays, silicas, or other commonly used materials.

Prior to this invention, the transition metal oxide supports described above have been prepared by any convenient method. It has been found, however, that products with superior catalytic activity are formed when the transition metal oxide support is an aerogel. It has also been found that a superior aerogel support is prepared using a "sol-gel" route, with super-critical fluid extraction of the gel.

Sol-gel Route

An alcogel, consisting of a polymerized transition metal oxide network gelled with an alcoholic solvent, is first prepared by any means. One method is to react a metal alkoxide, which consists of a compound having metal-to-oxygen-to-carbon bonds, with an aqueous alcohol solution to form the alcogel. Use of metal chlorides and halide containing compounds, such as $TiCl_4$ or $ZrCl_4$, or metal alkyl or chlorides and halide containing compounds, such as $TiCl_4$ or $ZrCl_4$, or metal alkyl or The metal alkoxides have the general formula $M(OR)_n$, where M is the metal, R is an alkyl group of general formula $C_iH_{2i+1}$, with i usually having values of 1, 2, 3 or 4, and n is the valence of the metal. Up to n different R groups can occur in each compound. Values of n can range from 1 to 5, depending upon the metal, n being 4 for both titanium and zirconium. In addition, the metal alkoxides may occur as adducts with alcohols. Such alcohols may or may not be based on the same R grouping as the metal alkoxide. As noted above, metal alkoxides are characterized by having metal to oxygen to carbon bonds, as opposed to direct metal to carbon bonds which occur in alkyl metal compounds. These metal alkoxides are usually liquids, although solid metal alkoxides can also be employed. Their use is advantageous in that they can be obtained in high purity (avoiding contaminants that are potentially harmful),, are convenient to use, and are readily decomposed to the metal oxide. Useful compounds include, but are not limited to, those listed in Table 1.

TABLE 1

| | |
|---|---|
| titanium isobutoxide | $Ti(OCH(CH_3)C_2H_5)_4$ |
| titanium n-butoxide | $Ti(OC_4H_9)_4$ |
| titanium ethoxide | $Ti(OC_2H_5)_4$ |
| titanium 2-ethylhexoxide | $Ti(OCH_2CH(C_2H_5)C_4H_9)_4$ |
| titanium methoxide | $Ti(OCH_3)_4$ |
| titanium n-propoxide | $Ti(OC_3H_7)_4$ |
| titanium isopropoxide | $Ti(OCH(CH_3)_2)_4$ |

TABLE 1-continued

| | |
|---|---|
| zirconium n-butoxide | $Zr(OC_4H_9)_4$ |
| zirconium t-butoxide | $Zr(OC(CH_3)_3)_4$ |
| zirconium isopropoxide | $Zr(OCH2(CH_3)_2)_4$ |
| zirconium ethoxide | $Zr(OC_2H_5)_4$ |
| zirconium n-propoxide | $Zr(OC_3H_7)_4$ |
| zirconium pentyloxide | $Zr(OC_5H_{11})_4$ |
| zirconium n-butoxide butanol complex | $Zr(OC_4H_9)_4 \cdot C_4H_9OH$ |
| zirconium isopropoxide isopropanol complex | $Zr(OCH_2(CH_3)_4 \cdot (CH_3)_2CHOH$ |

Of these metal alkoxide compounds which are all presently available commercially from Alpha Products, Ward Hill Massachusetts, titanium n-butoxide, titanium isobutoxide, titanium isopropoxide, zirconium n-butoxide, and zirconium n-propoxide are preferred.

The alcogel is formed by combining one or more metal alkoxides with a first solution comprising an organic solvent, such as an alcohol, and an inorganic acid, and then mixed with a second solution comprising water and an alcohol. The product is then allowed to gel. The water component of this mixture reacts with the alkoxide radicals of the metal alkoxides in a hydrolysis reaction, the product of which is a polymerized transition metal-oxygen network containing water and alcohol to constitute a gel. The inorganic acid serves as a homogeneous catalyst to increase the rate and degree of polymerization. The first solution contains 0.1 to 5 milliliters(ml) of alcohol per millimole (mmole) of transition metal alkoxide (or per mmole of combined transition metal alkoxides), with from 0.001 to 0.10 ml of inorganic acid per ml of alcohol. Preferred alcohols are those having 6 or fewer carbon atoms, with propanols and butanols being more preferred. The inorganic acid should be one that will decompose in subsequent heating steps. For example, nitric acid, $HNO_3$, in 6 molar concentration in aqueous solution, is found to be quite suitable. The second gelling solution contains sufficient water to hydrolyze the oxygen-carbon bonds of the transition metal alkoxides; excess water is used to insure complete reaction. From 1 to 10 mmoles of water per mmole of metal alkoxide(s) mixed with 0.1 to 5 ml of alcohol per mmole of metal alkoxide(s)is used, with the alcohol selected from the same preferred group used in the first solution.

Both solutions are well mixed and then combined while assuring complete mixture. The required product is a single-phase gel containing no excess solvent. After gelation is complete, solvents, alcohol, and water are removed from the alcogel. While any suitable method for producing an aerogel may be used, the preferred method is removal through the use of super-critical fluid extraction ("SCF extraction").

SCF Extraction

The alcogel is placed inside a suitable vessel, such as an autoclave, where temperature, pressure, and flow through the vessel can be controlled. A supercritical fluid flows through the vessel, replacing solvents contained in the gel. Extraction continues in this fashion until all of the solvent is replaced. Next, super-critical conditions are removed, and the super-critical fluid vaporizes, resulting in a dry aerogel product comprising the transition metal oxide or oxides containing no free solvent, alcohol, or water. This preparation method is preferred, as we have found that conventional drying of alcogels to form aerogels can lead to collapse of the product and undesired physical modifications, resulting in a product of lesser quality.

A variety of substances can be used for the super-critical extraction, e.g., methane, ammonia or carbon dioxide. Carbon dioxide, $CO_2$, is convenient and safe to work with, Under a continuous flow of $CO_2$, the vessel is pressurized and heated to $CO_2$ super-critical conditions, such as those given in "Chemical Engineer's Handbook," Fifth Edition, McGraw-Hill. Super-critical operating conditions are above the critical point of $CO_2$, i.e., 31° C. and 1072 psi. The preferred range is from 50 to 120° C. and from 2500 to 4000 psi. $CO_2$ flow rates can range from 0.005 to 0.5 standard cubic feet per minute ("SCFM") per 100 $cm^3$ of material to be extracted, as measured prior to compression to super-critical fluid conditions. A preferred rate is from 0.01 to 0.1 SCFM per 100 $cm^3$ of material to be extracted. Extraction proceeds until all of the extractable solvent, alcohol, and water contained in the alcogel is replaced by the super-critical fluid.

Post Extraction Processing of Support

After extraction, the dry aerogel product is optionally mixed with a binder of smaller than 40 mesh particle size, optionally shaped into extrudates, and then heat-treated to form a support. The heat treatment involves a passivation step to neutralize the inorganic acid and an oxidation step to remove both any impurities and the inorganic acid. The material is heat treated according to the following procedure: Dry at a temperature of about 90 to about 150° C., for about one hour under air or inert gas; then heat to a temperature of about 300 to about 1000° C. at a rate of 1 to 40° C. per minute under an inert gas, e.g., $N_2$; hold at a temperature of about 300 to about 1000° C. for between 1 to 16 hours in the inert gas; switch to an oxygen containing gas, such as air, and hold at a temperature of about 300 to about 1000° C. for between 1 to 16 hours; and then cool to room temperature under the oxygen containing gas.

The support should consist of particles suitable for use in a catalytic reactor, having particle sizes between 0.03 cm and 0.635 cm inches, i.e., not a fluidizable material and not a monolithic material.

Deposition of Active Metals

The active metals are placed onto the support after the above heat treatment steps. The active metals include those from columns 6, 7, 8, 9, and 10 of the periodic table. Preferred metals include Cr, Mo, W, Fe, Co, Re, Ir, Ni, Pd, and Pt. More preferred for application in hydroprocessing are Mo, W, Ni, and Co. For other applications, such as isomerization, alkylation or hydrocracking, Pt, Pd, Re, and Ir may be preferred. These can be applied singly or in any multiple combination, in a single or multiple deposition step, and by any suitable deposition means. Possible deposition methods include equilibrium adsorption from solutions of the metal salts, or incipient wetness impregnation of solutions containing the metal salts.

A preferred technique of adding metals to the transition metal oxide support is incipient wetness impregnation. The desired amount of metal salt is dissolved in a solvent, such as water, hydrogen peroxide solution, acetone, alcohol, or other convenient solvent. The volume of solvent should correspond to the pore volume capacity of the support. This solution is placed onto the support, in a manner which assures that all of the solution is placed evenly throughout the support volume. More than one metal salt can be dissolved in the solvent for simultaneous deposition. In the case where the volume of solvent needed to dissolve the desired amount of salt exceeds the pore volume of the support, multiple impregnation steps can be undertaken, with intermediate drying steps. Also, multiple impregnation steps with different solvents and salts can be undertaken, with intermediate drying and heat treating steps. The aqueous solution can contain an acid, such as $H_3PO_4$, to enhance solubility of the metal salts. In such cases, the amount of acid should be less than, 5 wt. %, based on weight of solvent used.

The drying step involves removing all free solvent at a temperature of about 50 to about 150° C. for between about 1 and about 16 hours, in an inert or an oxygen containing atmosphere, and under vacuum or atmospheric pressure. The heat treatment step involves heating the material in an oxygen containing gas, such as air, at a sufficiently high temperature to remove all solvent and to decompose the metal salts into their component oxides. Such a step involves heating the material to a temperature of about 300 to about 1000° C., at a rate of 1 to 20° C. per minute, and holding it at a temperature of about 300 to about 1000° C. for up to 48 hours, preferably at a temperature of about 300° C. to about 600° C. for between 1 to 6 hours, and then cooling it to room temperature, all under a flow of oxygen containing gas at a rate sufficient to remove reaction products arising from the decomposition of the metal salts, e.g., between about 1 and about 100 SCFM.

Suitable metal salts include soluble oxides, hydrated oxides, hydroxides, chlorides, oxychlorides or other halide containing salts, carbonates, soluble sulfides, nitrates, sulfates, phosphates, borates, and the like. Preferred compounds include $(NH_4)_6MO_7O_{24}.4H_2O$ and $(NH_4)_2WO_4$ or other molybdenum and tungsten containing ammonium salts of various water content, and $Ni(NO_3)_2.6H_2O$ and $Co(NO_3)_2.6H_2O$ or the corresponding anhydrous nitrates.

The composition of a material prepared as described above, i.e., prepared by the sol-gel route followed by SCF extraction and deposition of active metals, can range from 0.5 to 40 wt. % of each metal deposited, with the balance being the transition metal oxide support. Preferably the composition can range from 0.5 to 40 wt. % of either Mo or W or both Mo and W, measured as metal content but occurring as an oxide, and from 0.5 to 20 wt. % of either Co or Ni or both Co and Ni, measured as metal content but occurring as an oxide. A more preferred composition may be from 5 to 20 wt. % Mo or W, and from 1.5 to 8 wt. % Ni or Co. The balance of the weight in all of these cases consists of the transition metal oxide support prepared as described above together with any optional binder material.

Sulfiding

After the final heating step, the product is then treated so that the active metals are at least partially sulfided. This can be accomplished by several techniques. One method is to load the material to be sulfided into a hydroprocessing reactor, and then contact it with sulfur containing compounds. Such sulfur containing compounds can be $H_2S$ mixed with $H_2$ in concentrations ranging from 0.5 to 20 wt. % $H_2S$. The conditions can range from 250 to 500° C. and from 0 to 1000 psig, under a continuous flow at rates of from 1 to 50 standard cubic centimeters ("SCCM") of gas per ml of catalyst and for a length of time required to complete the reaction, typically between 0.5 and about 6 hours. Alternatively, the catalyst can be contacted with a non-aqueous solution of a reactive sulfur containing compound, such as a thiol, a sulfide or a disulfide, including compounds such as propanethiol, butyl disulfide, or other suitable compounds. Solvents can include refinery hydrocarbon streams such as gas-oils, paraffinic liquids such as hexanes, or other suitable non-aqueous solvents. The solution, containing at least enough sulfur to stoichiometrically sulfide the catalyst, is contacted with the catalyst material to be sulfided by: completely filling the catalyst bed with the liquid under conditions ranging from 100 to 400° C.; from 0 to 1000 psig; from no flow to 10.0 LHSV ("liquid hourly space velocity"), i.e., cm$^3$ liquid per cm$^3$ catalyst per hour, and for a length of time required to complete the reaction, e.g., between about 0.5 and about 12 hours. The catalyst is simultaneously contacted with a gas flow containing at least 60% $H_2$ at from about I to about 50 SCCM (the gas can be recycled). Alternatively, the liquid solution can be contacted with the material to be sulfided outside of the hydroprocessing reactor, in any suitable equipment. The sulfided catalyst is then dried in an oxygen-free environment and placed into the hydroprocessing reactor.

The Completed Catalyst

After the sulfiding procedure is complete, the material can be used as a catalyst for hydroprocessing and hydrocracking of refinery hydrocarbon streams, such as light cycle gas oils, heavy cycle gas oils, light or heavy naphthenates, vacuum gas oils, or any other refinery streams used in a typical hydroprocessing reaction. The use and operation of hydroprocessing and hydrocracking reactions are well known and carried on extensively in practical operation. Typical operating conditions for the catalyst of this invention may range, but are not limited to, from 200 to 600° C., from 0 to 2500 psig, from 0.2 to 10 LHSV of the hydrocarbon stream based on catalyst volume, and from 1 to 40 SCCM of gas per cc of liquid, the gas consisting of recycle, i.e., purified reactor outlet gas, and $H_2$ makeup, and containing at least 60% $H_2$.

The preparation and use of materials of this invention are further described by the following illustrative Examples. These Examples are not intended to limit the scope of the invention in any manner.

EXAMPLE 1

This Example describes the preparation of a transition metal oxide support according to one method of this invention, through the use of super-critical fluid (SCF) extraction. Titanium n-butoxide, $Ti(OC_4H_9)_4$, was mixed with dried propanol under dry nitrogen, in a proportion of 0.5 ml of propanol per mmole of $Ti(OC_4H_9)_4$, To this mixture was added 0.01 ml of 6 molar nitric acid per ml of propanol. To this mixture was added a solution consisting 4 mmole of water per mmole of $Ti(OC_4H_9)_4$ mixed with 0.5 ml of propanol per mmole of $Ti(OC_4Hg)_4$, A clear rubber-like gel formed immediately upon combination of the two solutions. This product was an alcogel with a mixture of propanol and water solvents contained in the gel pores.

The solvents were extracted from the alcogel with super-critical carbon dioxide in an autoclave. Carbon dioxide, under conditions of from 3000 to 3500 psi and from 65 to 100° C., was passed through the alcogel for about 3 hours, at which point all of the propanol and water solvent contained in the gel was replaced with super-critical $CO_2$. The pressure was reduced at a rate of 100 psi per min, while the temperature was maintained at a level sufficient to keep the $CO_2$ under super-critical conditions. When the pressure was reduced below about 1072 psi, while the temperature was maintained above the super critical temperature, the $CO_2$ evaporated. At this point the product was removed from the autoclave extractor. The resulting product was a solid, dry, fine, granular aerogel material, which was sieved to pass through a 100 mesh screen.

6.40 grams of this $TiO_2$ aerogel product were mixed with 1.60 g. of commercially available, highly dispersed $Al_2O_3$ powder to serve as a binder, such that the final product contained 80 wt. % $TiO_2$ and 20 wt. % $Al_2O_3$. Sufficient water was added to form a stiff paste, and the paste was forced through a die to form approximately 1/16" diameter extrudates. This product was dried at 110° C. in an air-purged vacuum for one hour, and then heat treated according to the following schedule: purge with flowing nitrogen for thirty minutes, heat to 400° C. in 40 minutes with flowing nitrogen, heat at 400° C. for two hours with nitrogen, heat at 400° C. for four hours with flowing air, cool to room temperature with flowing air.

EXAMPLE 2

This Example describes the preparation of a material according to this invention, suitable for use in a hydroprocessing process, and using a support prepared according to Example 1. Onto the product of Example 1 was placed 0.88 g. of ammonium heptamolybdate, $(NH_4)_6Mo_7O_{24}.6H_2O$, dissolved in sufficient quantity of water to saturate the pores of the support, by the incipient wetness impregnation technique. This product was dried and heat-treated as described in Example 1. Onto this product was placed 0.79 g. of nickel nitrate hexahydrate, $Ni(NO_3)_2.6H_2O$, by the same method, and the product was dried and heat-treated by the same method.

EXAMPLE 3

This example describes a procedure used to test the materials of this invention as hydroprocessing catalysts. A volume of the material to be tested is placed inside of a stainless steel tubular reactor. The material is sulfided in a 10 wt. % mixture of $H_2S$ in $H_2$ at a rate of 9 standard cubic centimeters (SCCM) of gas per cm$^3$ catalyst, at 300° C. and at atmospheric pressure, and maintained at 300° C. for three hours. After completion of sulfiding, hydroprocessing is commenced under the following conditions: gas flow is switched to pure $H_2$ at 9 SCCM per cm$^3$ of catalyst, and liquid hydrocarbon, feedstock is flowed at 2 ml/hr per cm$^3$ of catalyst, corresponding to 2 liquid-hourly space velocity ("LHSV"), with the overall reactor pressure being held at 400 psi and operated at 300° C. The liquid feed is representative of the type treatable by the catalysts of this invention, consisting of a light straight-run gas oil (LSRGO) having the properties described in Table 2. After operating in this mode for a minimum of 24 hours, liquid products are removed for analysis for sulfur and nitrogen content by X-ray fluorescence and pyrolysis, respectively. Note that the hydroprocessing conditions selected allow for only partial hydrodesulfurization and hydrodenitrogenation of the feed. These conditions facilitate comparisons between different catalyst materials.

TABLE 2

| Properties of Light Straight Run Gas Oil | |
|---|---|
| Gravity | 35.9° |
| IBP | 478° F. |
| 10% | 503° F. |
| 50% | 536° F. |
| 90% | 592° F. |
| FBP | 648° F. |
| S, wt % | 1.37 |
| N, ppm | 83. |
| density | 0.8453 g/cm$^3$ |

Heterogenous catalysis, i.e.,. where the catalyst and the material to be catalyzed are in different physical states, is a surface phenomenon. The rate of reaction is proportional to the surface area of the catalyst and the catalytic reactivity of such a catalyst is approximately proportional to the concentration of catalytically active sites on its surface. Therefore, a meaningful comparison of catalyst reactivities is made by determining the rate of reaction per unit surface area of the catalysts to be compared. For example, the sulfur removal rate of a catalyst, $R_S$, can be expressed in units of grams sulfur removed per square meter of catalyst per hour, [(g)sulfur]/[(m$^2$)catalyst(h)], and the nitrogen removal rate, $R_N$, can be expressed in units of parts per million by weight (ppm) nitrogen removed per square meter of catalyst per hour, [ppm nitrogen]/[(m$^2$)catalyst(h)].

The sulfur removal rate can be calculated for any given catalyst by the following equation:

$$R_S = [(LHSV)(\rho\ feed)(S\ conversion)]/[(\rho\ cat)(SA\ cat)]$$

where

LHSV = ("liquid hourly space velocity")in units of cm$^3$ feed per cm$^3$ catalyst per hour;

$\rho$ feed = density of the feed in units of g. feed per cm$^3$ feed; wt S in feed = g. S per g. feed;

S conversion = the percentage of sulfur removed, calculated as $(S_F-S_P)/S_F$, where $S_F$ is the wt S in feed and $S_P$ is the wt S in product;

$\rho$ cat = density of the catalyst, in units of g. catalyst per cm$^3$ of catalyst; and SA cat = the surface area contained per unit weight of catalyst expressed in units of Cm$^2$ per g catalyst.

The nitrogen removal rate can be calculated for any given catalyst by the following equation:

$$R_N = [(LHSV)(\rho\ feed)(concentration\ N\ in\ feed)(N\ conversion)]/[(\rho\ cat)(SA\ cat)]$$

where

LHSV = ("liquid hourly space velocity")in units of cm$^3$ feed per cm$^3$ catalyst per hour;

$\rho$ feed = density of the feed in units of g. feed per cm$^3$ feed;

concentration

N in feed = ppm by weight nitrogen

N conversion = the percentage; of nitrogen removed, calculated as $(N_F-N_P)/N_F$, where $N_F$ is the concentration nitrogen in feed and $N_P$ is the concentration nitrogen in product;

$\rho$ cat = density of the catalyst, in units of g. catalyst per cm$^3$ of catalyst; and SA cat = the surface area contained per unit weight of catalyst expressed in units of cm$^2$ per g catalyst.

EXAMPLE 4

This Example describes several comparative materials, not of this invention, in order to show that materials of this invention are more suitable as hydroprocessing catalysts. The first, 4a, is a material having the same proportions of elements as the material described in Example 2. A mixed TiO$_2$/Al$_2$O$_3$ support was prepared by mixing 20.00 g. of a commercially available TiO$_2$ with 5.00 g. of a commercially available Al$_2$O$_3$, and then adding sufficient water to form a paste. This material was then extruded, dried, and heat-treated as in Example 1 to form a support. Onto this support was added 2.76 g. of (NH$_4$)$_6$Mo$_7$O$_{24}$.6H$_2$O and 2.48 g. of Ni(NO$_3$)$_2$.6H$_2$O by the same procedures as used in Example 2.

Similarly, a material, 4b, was formed from 25.0 g. of the same commercially available TiO$_2$, with 2.76 g. of (NH$_4$)$_6$MO$_7$O$_{24}$.6H$_2$O and 2.48 g. of Ni(NO$_3$)$_2$.6H$_2$O. A third material, 4c, was formed using 25.0 g. of the same commercially available Al$_2$O$_3$, 3.44 g. of (NH$_4$)$_6$MO$_7$O$_{24}$.6H$_2$O, and 3.15 g. of Ni(NO$_3$)$_2$.6H$_2$O. The deposited metals were all deposited by the procedures used in Example 2.

EXAMPLE 5

The material prepared in Example 2 and the comparative materials prepared in Example 4 were tested according to the procedures described in Example 3. 4.7 cm$^3$ of Ni—Mo/SCF TiO$_2$/Al$_2$O$_3$ from Example 2, 5.0 cm$^3$ of Ni—Mo/TiO$_2$/Al$_2$O$_3$ of Example 4a, 10 cm$^3$ of Ni—Mo/TiO$_2$ of Example 4b, and 10 cm$^3$ Of Ni—Mo/Al$_2$O$_3$ of Example 4c were tested, with liquid and gas flow rates adjusted accordingly. The results are listed in Table 3. Also listed in Table 3 is the surface area, in square meters per gram, of the materials after exposure to hydroprocessing reaction conditions and the densities of the catalysts.

The results show that a material prepared using a sol-gel route with supercritical fluid extraction exhibits significantly higher sulfur and nitrogen removal rates expressed in units of grams sulfur removed per unit surface area of catalyst, or ppm N removed per unit surface area of catalyst, than for conventionally prepared materials containing mixed or single oxide supports. Also listed in Table 3 is the weighted average of removal rate for the TiO$_2$ and Al$_2$O$_3$ supported catalysts prepared in Example 4. This average removal rate is close to that found for the mixed oxide support in Example 4. This indicates that the material of this invention exhibits properties that are not simply an additive effect of its components, but rather properties that are unique to this material and its method of preparation.

TABLE 3

| Results From Testing Materials of Examples 2 and 4 | | | | |
|---|---|---|---|---|
| Ex. | catalyst composition | $R_S$ | $R_N$ | S.A.[1] | Density (g/cm$^3$) |
| 2 | Ni—Mo/SCF TiO$_2$/Al$_2$O$_3$ (80/20) | .0321 | 2.17 | 38. | 1.196 |
| 4a | Ni—Mo/TiO$_2$/Al$_2$O$_3$ (80/20) | .0277 | 1.62 | 53. | 0.955 |
| 4b | Ni—Mo/TiO$_2$ | .0298 | 1.78 | 42. | 0.855 |
| 4c | Ni—Mo/Al$_2$O$_3$ | .0173 | 0.59 | 179. | 0.573 |
| avg. of 80% of 4b and 20% of 4c | | .0273 | 1.54 | — | — |

[1]Surface areas, in m$^2$/g, were obtained using the commonly employed BET method, after the catalysts were used for sulfur and nitrogen removal.

[1]Surface areas, in m²/g, were obtained using the commonly employed BET method, after the catalysts were used for sulfur and nitrogen removal.

EXAMPLE 6

The materials prepared in Examples 2 and 4a were analyzed by X-ray diffraction. The diffractograms obtained are given in FIG. 1 for Example 2 and FIG. 2 for Example 4a. Although having the same constituent composition in the same proportions, the material of this invention is poorly crystalline as compared to the comparative material, and so has a unique structure and properties, as already noted in Example 5 above.

Table 4 is an analysis of the X-ray diffractograms of FIGS. 1 and 2. Data for average particle diameter is based on peak broadening, using the diffraction peaks corresponding to anatase (101) and rutile (110) crystallographic planes. The weight distribution between anatase and rutile was calculated using intensity ratio data obtained from open literature. This data shows that a major component of the two materials, $TiO_2$, is substantially different between the two, in that the material of this invention contains more of the anatase form of $TiO_2$, and has significantly smaller particle diameters.

TABLE 4

Comparison of $TiO_2$ Properties of Materials From Example 2 and 4a

| Ex. | catalyst composition | anatase Wt. %[2] | d[3] | rutile wt. % | d |
|---|---|---|---|---|---|
| 2 | Ni—Mo/SCF $TiO_2$/$Al_2O_3$ (80/20) | 88 | 7.8 | 12 | 18.5 |
| 4a | Ni—Mo/$TiO_2$/$Al_2O_3$ (80/20) | 64 | 27.0 | 36 | 37.5 |

[2]Weight percent is based on $TiO_2$ component.
[3]Average particle diameter, is in nanometers.

EXAMPLE 7

2Weight percent is based on $TiO_2$ component. 3Average particle diameter, is in nanometers.

Two additional materials prepared according to this invention are described. Using the method of Example 1, zirconium propoxide, $Zr(OC_3H_7)_4$ was mixed with propanol in the proportion of 0.5 ml of propanol per mmole of $Zr(OC_3H_7)_4$ and with 0.04 ml of 6M $HNO_3$ per ml of propanol. To this mixture was added a solution consisting 4 mmole of water per mmole of $Zr(OC_3H_7)_4$ mixed with 0.5 ml of propanol per mmole of $Zr(OC_3H_7)_4$. This alcogel product was extracted, dried, and heat-treated as described in Example 1; however, no binder was used in this case. Onto 6.00 g. of this product was added 0.67 g. of $(NH_4)_6Mo_7O_{24}\cdot 6H_2O$ and 0.59 g. of $Ni(NO_3)_2\cdot 6H_2O$ by the method of Example 2 to form a material, 7a, of composition Ni—Mo/SCF $ZrO_2$.

Another material, 7b, was prepared in a similar manner. A mixture of zirconium butoxide and titanium n-propoxide was used as the starting material, in proportions required to produce a product containing 80 percent by weight $TiO_2$ and 20 percent by weight $ZrO_2$ in the extruded intermediate product. The alkoxide mixture was combined with 0.58 ml of propanol per total mmoles of zirconium butoxide and titanium n-propoxide and with 0.03 ml of 6M $HNO_3$ per ml of propanol. To this mixture was added 2.1 mmole of water per total mmoles of zirconium butoxide and titanium n-propoxide and 0.58 ml of propanol per total mmoles of zirconium butoxide and titanium n-propoxide. This was treated as above. Onto 8.75 g. of the intermediate product was placed 0.98 g. of $(NH_4)_6Mo_7O_{24}\cdot 6H_2O$ and 0.86 g. of $Ni(NO_3)_2\cdot 6H_2O$, as above, to form a material of composition Ni—Mo/SCF $TiO_2$/SCF $ZrO_2$ (80/20), These two materials were tested according to the procedure of Example 3, and the results are listed in Table 5, together with the surface areas, in m²/g, and the densities, in g/cm³, of the materials after being exposed to reaction conditions. These materials have sulfur and nitrogen removal rates greater than the comparative materials of Example 4, and again illustrate the advantages of using a material of this invention for hydroprocessing.

TABLE 5

Results From Testing Materials of Example 7

| Ex. | catalyst composition | $R_S$ | $R_N$ | S.A.[1] | Density (g/cm³) |
|---|---|---|---|---|---|
| 7a | Ni—Mo/SCF $ZrO_2$ | .020 | 0.67 | 16. | 1.65 |
| 7b | Ni—Mo/$TiO_2$/$ZrO_2$ (80/20) | .030 | 4.45 | 34. | 1.148 |

[1]S.A. is surface area after being used in process, in m²/g.

We claim:

1. A process for the catalytic removal of sulfur and nitrogen from a heavy cycle gas oil hydrocarbon stream consisting essentially of:
   a) combining the heavy cycle gas oil hydrocarbon stream with a gas containing at least 80% $H_2$ to form a gas-stream combination; and
   b) passing the gas-stream combination at 200° C.–600° C., 0–2500 psig and at 0.2–10 LHSV over a catalyst composition prepared by the method comprising:
      i. forming a transition metal oxide aerogel support comprising a mixture of $TiO_2$ and $ZrO_2$ by the steps comprising:
         forming a transition metal oxide alcogel;
         extracting the alcogel with a supercritical fluid; and
         removing supercritical conditions;
      ii. drying and heat treating the aerogel support;
      iii. depositing at least one active metal selected from the group consisting of iron, cobalt, nickel, chromium, molybdenum and tungsten on the aerogel support; and
      vi. drying and heat treating the deposited aerogel support,
   c) whereby at least one of nitrogen and sulfur is removed from the hydrocarbon stream.

2. The process of claim 1 where the active metal comprises molybdenum.

3. The process of claim 1 where the active metal comprises nickel.

4. The process of claim 1 where the active metal comprises both molybdenum and nickel.

5. The process of claim 1 where the catalyst composition comprises between about 0.5 and about 40 wt. % of each metal deposited, with the balance being the transition metal oxide support.

6. The process of claim 1 where the catalyst composition comprises between about 0.5 and about 40 wt. % of molybdenum, between about 0.5 and about 20 wt. % of nickel, with the balance being the transition metal oxide support.

7. The method of claim 1 where the catalyst composition comprises between about 5 and about 20 wt. % of molybdenum, between about 1.5 and about 8 wt. % of nickel, with the balance being the transition metal oxide support.

8. The process of claim 1 where the catalyst composition is sulfided.

9. The process of slaim 1 where the mixture of $TiO_2$ and $ZrO_2$ comprises about 80 wt. % $TiO_2$, and about 20 wt. % $ZrO_2$.

10. The process of claim 1 where the aerogel support is mixed with an inorganic oxide prior to the deposition of the active metal.

11. The process of claim 10 where the inorganic oxide comprises about 20 wt. % of the aerogel support and inorganic oxide mixture.

12. The process of claim 11 where the inorganic oxide is alumina, or silica.

13. A process for the catalytic removal of sulfur and nitrogen from a light naphthenate, heavy naphthenate or light cycle gas oil hydrocarbon stream comprising:
   a) combining the light naphthenate, heavy naphthenate or light cycle gas oil hydrocarbon stream with a gas containing at least 80% $H_2$ to form a gas-stream combination; and
   b) passing the gas-stream combination at 200° C.–600° C., 0–2500 psig and at 0.2–10 LHSV over a catalyst composition prepared by the method comprising:
      i. forming a transition metal oxide aerogel support comprising a mixture of $TiO_2$ and $ZrO_2$ by the steps comprising,
         forming a transition metal oxide alcogel;
         extracting the alcogel with a supercritical fluid; and
         removing supercritical conditions;
      ii. drying and heat treating the aerogel support;
      iii. depositing at least one active metal selected from the group consisting of iron, cobalt, nickel, chromium, molybdenum and tungsten on the aerogel support; and
      vi. drying and heat treating the deposited aerogel support,
   c) whereby at least one of nitrogen and sulfur is removed from the hydrocarbon stream.

14. The process of claim 13 where the active metal comprises molybdenum.

15. The process of claim 13 where the active metal comprises nickel.

16. The process of claim 13 where the active metal comprises both molybdenum and nickel.

17. The process of claim 13 where the catalyst composition comprises between about 0.5 and about 40 wt. % of each metal deposited, with the balance being the transition metal oxide support.

18. The process of claim 13 where the catalyst composition comprises between about 0.5 and about 40 wt. % of molybdenum, between about 0.5 and about 20 wt. % of nickel, with the balance being the transition metal oxide support.

19. The method of claim 13 where the catalyst composition comprises between about 5 and about 20 wt. % of molybdenum, between about 1.5 and about 8 wt. % of nickel, with the balance being the transition metal oxide support.

20. The process of claim 13 where the catalyst composition is sulfided.

21. The process of claim 13 where the mixture of $TiO_2$ and $ZrO_2$ comprises about 80 wt. % $TiO_2$ and about 20 wt. % $ZrO_2$.

22. The process of claim 13 where the aerogel support is mixed with an inorganic oxide prior to the deposition of the active metal.

23. The process of claim 22 where the inorganic oxide comprises about 20 wt. % of the aerogel support and inorganic oxide mixture.

24. The process of claim 22 where the inorganic oxide is alumina, or silica.

* * * * *